United States Patent
Sisto et al.

(10) Patent No.: US 7,436,765 B2
(45) Date of Patent: Oct. 14, 2008

(54) METHOD AND APPARATUS FOR DYNAMICALLY ALLOCATING UPSTREAM BANDWIDTH IN PASSIVE OPTICAL NETWORKS

(75) Inventors: John Ferdinand Sisto, Rohnert Park, CA (US); Edward Wayne Boyd, Petaluma, CA (US)

(73) Assignee: Teknovus, Inc., Petaluma, CA (US)

( * ) Notice: Subject to any disclaimer, the term of this patent is extended or adjusted under 35 U.S.C. 154(b) by 697 days.

(21) Appl. No.: 10/930,336

(22) Filed: Aug. 30, 2004

(65) Prior Publication Data

US 2005/0047783 A1      Mar. 3, 2005

Related U.S. Application Data (63) Continuation-in-part of application No. 10/663,608, filed on Sep. 15, 2003.

(60) Provisional application No. 60/499,465, filed on Sep. 3, 2003.

(51) Int. Cl.
*H04J 3/16* (2006.01)
(52) U.S. Cl. .................... 370/230; 370/236
(58) Field of Classification Search .............. None
See application file for complete search history.

(56) References Cited

U.S. PATENT DOCUMENTS

| | | | |
|---|---|---|---|
| 6,546,014 B1 | 4/2003 | Kramer et al. | 370/395.41 |
| 6,721,797 B1 * | 4/2004 | Kim | 709/232 |
| 6,795,398 B1 * | 9/2004 | Toyoda et al. | 370/231 |
| 6,801,547 B1 * | 10/2004 | Boyd et al. | 370/508 |
| 2003/0170032 A1 * | 9/2003 | Song et al. | 398/168 |
| 2005/0249497 A1 * | 11/2005 | Haran et al. | 398/58 |

FOREIGN PATENT DOCUMENTS

| | | |
|---|---|---|
| EP | 1 130 841 A1 | 9/2001 |
| WO | WO 02/37730 A2 | 5/2002 |

* cited by examiner

*Primary Examiner*—Wing F. Chan
*Assistant Examiner*—Anthony Sol
(74) *Attorney, Agent, or Firm*—Park, Vaughan & Fleming LLP (57) ABSTRACT

One embodiment of the present invention provides a system that facilitates dynamic allocation of upstream bandwidth in a passive optical network which includes a central node and at least one remote node. Each remote node is coupled to at least one logical entity and includes a number of queues, each of which is associated with a logical entity and stores upstream data from the logical entity. The central node is coupled to an external network through a shared out-going uplink. During operation, the system receives a request from a remote node for a grant to transmit upstream data from a logical entity, wherein the request reports the state of a queue associated with a logical entity; wherein the size of the data to be transmitted does not exceed a transmission threshold assigned to that logical entity, and wherein a logical entity may not request more than what is allowed by the corresponding transmission threshold. If the request satisfies a bandwidth allocation policy, the system issues a grant to the remote node to transmit upstream data. In response to the grant, the system receives upstream data from the remote node. Next, the system transmits the received upstream data to the out-going uplink according to a set of SLAs.

18 Claims, 7 Drawing Sheets

METHOD AND APPARATUS FOR DYNAMICALLY ALLOCATING UPSTREAM BANDWIDTH IN PASSIVE OPTICAL NETWORKS

RELATED APPLICATIONS

This application is a continuation-in-part of a pending U.S. patent application, entitled "Method and Apparatus for Dynamically Allocating Upstream Bandwidth in Passive Optical Networks," by inventors John F. Sisto and Edward W. Boyd, Ser. No. 10/663,608, filed 15 Sep. 2003. This application hereby claims priority under 35 U.S.C. §120 to the above-listed patent application. This application also claims priority under 35 U.S.C. §119 to U.S. Provisional Patent Application No. 60/499,465 filed on 3 Sep. 2003, entitled "Method and Apparatus for Software-Controlled Dynamic Bandwidth Allocation in EPON," by inventors John F. Sisto and Lawrence D. Davis.

BACKGROUND

1. Field of the Invention

The present invention relates to the design of passive optical networks. More specifically, the present invention relates to a method and apparatus for dynamically allocating upstream bandwidth in a passive optical network.

2. Related Art

In order to keep pace with increasing Internet traffic, optical fibers and associated optical transmission equipment have been widely deployed to substantially increase the capacity of backbone networks. However, this increase in the capacity of backbone networks has not been matched by a corresponding increase in the capacity of access networks. Even with broadband solutions, such as digital subscriber line (DSL) and cable modem (CM), the limited bandwidth offered by current access networks creates a severe bottleneck in delivering high bandwidth to end users.

Among different technologies, Ethernet passive optical networks (EPONs) appear to be the best candidate for next-generation access networks. EPONs combine the ubiquitous Ethernet technology with inexpensive passive optics. Therefore, they offer the simplicity and scalability of Ethernet, and the cost-efficiency and high capacity of passive optics. In particular, due to the high bandwidth of optical fibers, EPONs are capable of accommodating broadband voice, data, and video traffic simultaneously. Such integrated service is difficult to provide with DSL or CM technology. Furthermore, EPONs are more suitable for Internet Protocol (IP) traffic, since Ethernet frames can directly encapsulate native IP packets with different sizes, whereas ATM passive optical networks (APONs) use fixed-size ATM cells and consequently require packet fragmentation and reassembly.

Typically, EPONs are used in the "first mile" of the network, which provides connectivity between the service provider's central offices and business or residential subscribers. Logically, the first mile is a point-to-multipoint network, with a central office servicing a number of subscribers. A tree topology can be used in an EPON, wherein one fiber couples the central office to a passive optical splitter, which divides and distributes downstream optical signals to subscribers and combines upstream optical signals from subscribers (see FIG. 1).

Figure 2:
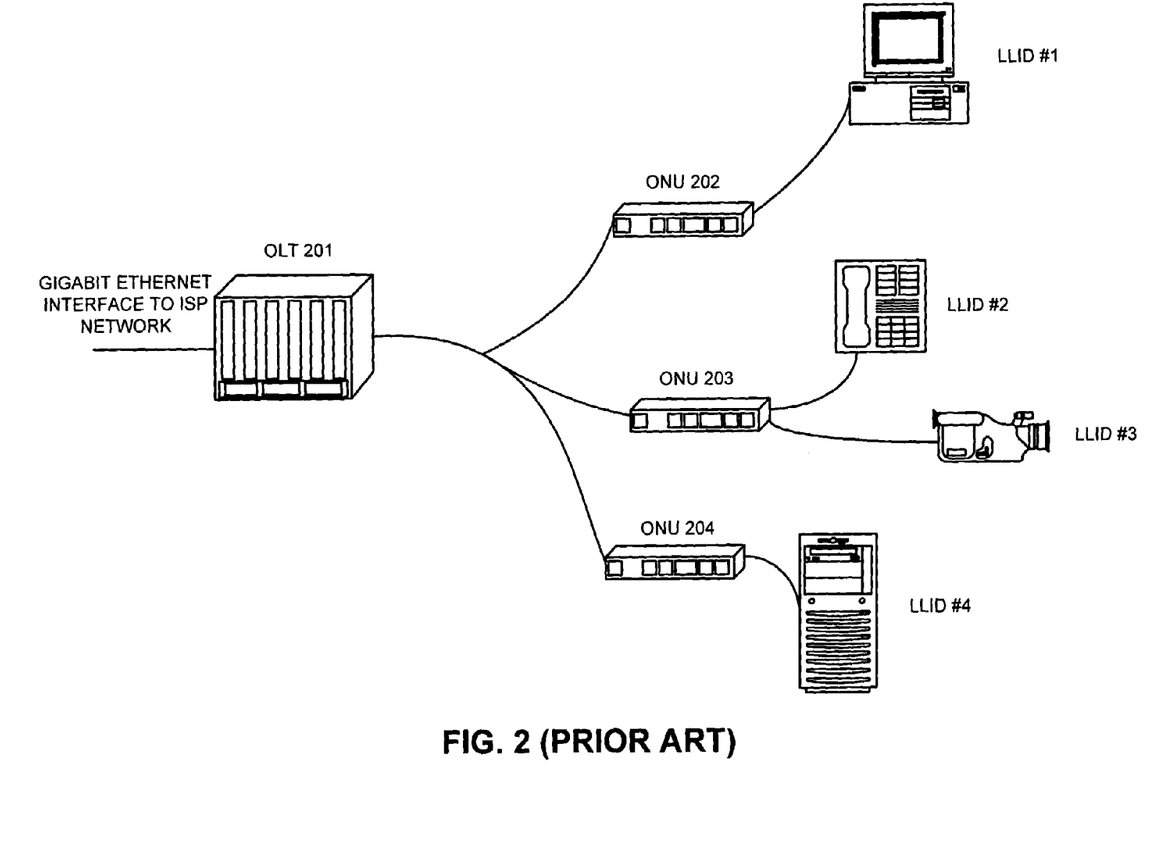
FIG. 2 illustrates a passive optical network including an OLT and ONUs (prior art).

Transmissions within an EPON are typically performed between an optical line terminal (OLT) and optical networks units (ONUs) (see FIG. 2). The OLT generally resides in the central office and couples the optical access network to the metro backbone, which is typically an external network belonging to an ISP or a local exchange carrier. The ONU can be located either at the curb or at an end-user location, and can provide broadband voice, data, and video services.

Communications within an EPON can be divided into upstream traffic (from ONUs to OLT) and downstream traffic (from OLT to ONUs). Because of the broadcast nature of Ethernet, the downstream traffic can be delivered with considerable simplicity in an EPON: packets are broadcast by the OLT and extracted by their destination ONU based on their Logical Link Identifier (LLID). However, in the upstream direction, the ONUs need to share the channel capacity and resources. Moreover, the burstiness of network traffic and the requirement of different service level agreements (SLAs) make the upstream bandwidth allocation a challenging problem.

Hence, what is needed is a method and apparatus for dynamically allocating upstream bandwidth in an EPON, which is fair, efficient, and responsive, and which accommodates bursty traffic while satisfying SLAs.

SUMMARY

One embodiment of the present invention provides a system that facilitates dynamic allocation of upstream bandwidth in a passive optical network which includes a central node and at least one remote node. Each remote node is coupled to at least one logical entity, which corresponds to a device or a user. Each remote node includes a number of queues, each of which is associated with a logical entity and stores upstream data from the logical entity. The central node is coupled to an external network outside of the passive optical network through a shared out-going uplink.

During operation, the system receives a request from a remote node for a grant to transmit upstream data from a logical entity associated with the remote node to the central node, wherein the request reports the state of a queue associated with a logical entity; wherein the size of the data to be transmitted does not exceed a transmission threshold assigned to that logical entity, and wherein a logical entity may not request more than what is allowed by the corresponding transmission threshold. If the request satisfies a bandwidth allocation policy, the system issues a grant to the remote node to transmit upstream data. In response to the grant, the system receives upstream data from the remote node. Next, the system transmits the received upstream data to the out-going uplink according to a set of SLAs.

In a variation of this embodiment, the system stores the state of the queue associated with the logical entity. The system then reads the state of the queue associated with the logical entity into a hardware scheduler. Next, the system schedules a grant in response to the request at the hardware scheduler and writes the grant to a grant buffer from the hardware scheduler. The system then transmits the grant to the remote node.

In a variation of this embodiment, the system stores the state of the queue associated with the logical entity. The system then reads the state of the queue associated with the logical entity into a programmable processor. Next, the system schedules a grant in response to the request at the hardware scheduler and writes the grant to a grant buffer from the programmable processor. The system then transmits the grant to the programmable processor.

In a further variation, the system prevents a hardware scheduler from writing a grant into the grant buffer when the programmable processor writes to the grant buffer.

In a further variation, the programmable processor is programmed to implement one or more scheduling policies.

In a further variation, the programmable processor is an on-board processor which resides with a hardware scheduler on a circuit board.

In a further variation, the programmable processor is an external processor which resides outside a circuit board where a hardware scheduler resides.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, application specific integrated circuits (ASICs), field-programmable gate arrays (FPGAs), semiconductor memories, magnetic and optical storage devices such as disk drives, magnetic tape, CDs (compact discs) and DYDs (digital versatile discs or digital video discs). For example, the transmission medium may include a communications network, such as the Internet.

Passive Optical Network Topology

Figure 1:
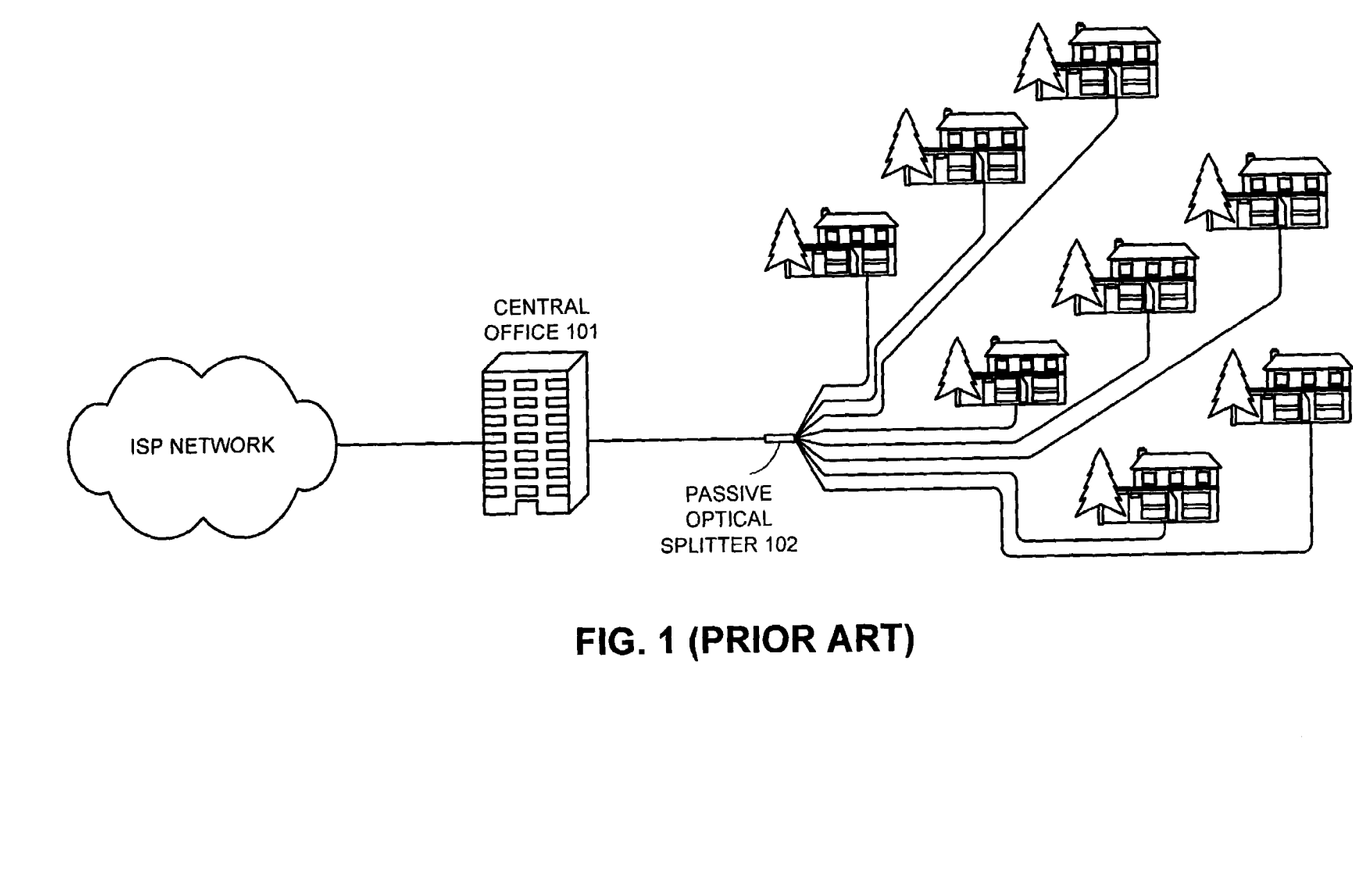
FIG. 1 illustrates a passive optical network wherein a central office and a number of subscribers form a tree topology through optical fibers and a passive optical splitter (prior art).

FIG. 1 illustrates a passive optical network, wherein a central office and a number of subscribers form a tree topology through optical fibers and a passive optical splitter. As shown in FIG. 1, a number of subscribers are coupled to a central office 101 through optical fibers and a passive optical splitter 102. Passive optical splitter 102 can be placed in the vicinity of end-user locations, so that the initial fiber deployment cost is minimized. The central office is coupled to an external network, such as a metropolitan area network operated by an ISP.

FIG. 2 illustrates a passive optical network including an OLT and ONUs. OLT 201 is coupled with ONUs 202, 203, and 204 through optical fibers and a passive optical splitter. An ONU can accommodate a number of networked devices, such as personal computers, telephones, video equipment, network servers, etc. Note that a networked device can identify itself by using an LLID, as defined in the IEEE 802.3 standard.

Dynamic Bandwidth Allocation Mechanism

Figure 3:
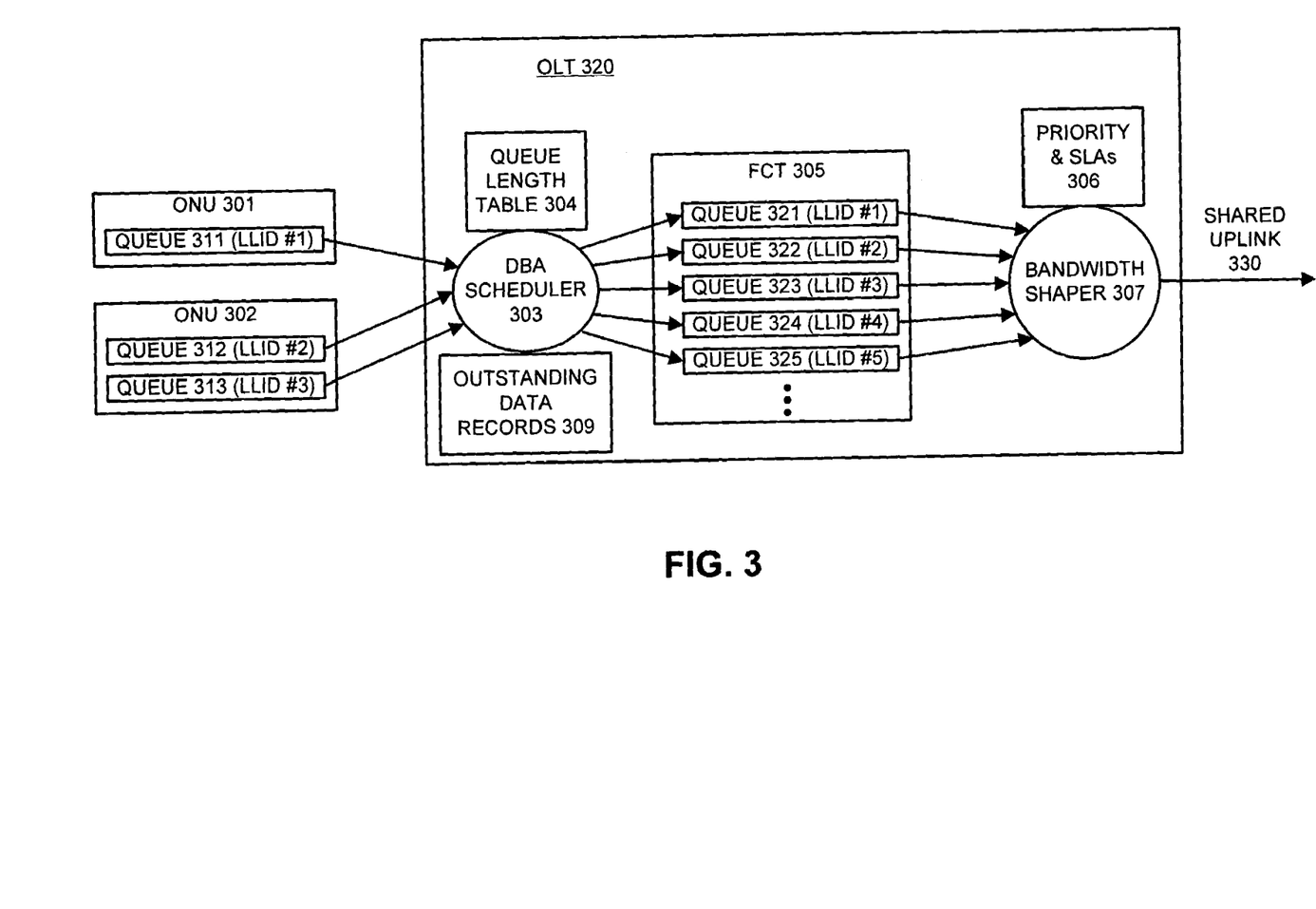
FIG. 3 illustrates the architecture of an OLT that facilitates dynamic upstream bandwidth allocation in accordance with an embodiment of the present invention.

FIG. 3 illustrates the architecture of an OLT that facilitates dynamic upstream bandwidth allocation in accordance with an embodiment of the present invention. In this example, an OLT 320 accepts requests and upstream data traffic from ONUs 301 and 302. Each ONU maintains a number of queues, for example queues 311, 312, and 313, each of which stores upstream data from an LLID corresponding to a device or a user that couples to that ONU. Note that upstream data from an LLID is carried in data frames (e.g., Ethernet frames), which have variable sizes. During transmission these data frames are removed from their respective queue. An LLID requests a grant, to transmit upstream data, via a report message. The report message indicates the amount of data in the LLID's corresponding queue(s). Typically, these request messages can piggyback on an upstream data transmission.

Within OLT 310, a dynamic bandwidth allocation (DBA) scheduler 303 receives the report messages from ONUs. OLT 310 also includes a FIFO queue controller (FCT) 305, which contains a number of FIFO queues (321, 322, 323, 324, and 325) that are associated with different LLIDs. Upstream data from each LLID is temporarily stored in these FIFO queues before being transmitted to the external ISP network through a shared uplink 330. The state of these FIFO queues is monitored and stored in a queue length table 304.

After receiving a request from an LLID, DBA scheduler 303 determines whether a grant to transmit can be sent to the requesting LLID based on two considerations. First, whether there is sufficient available space in the FIFO queue corresponding to the requesting LLID, according queue length table 304. Second, whether the requesting LLID is the next in turn to transmit data as scheduled. (Note that proper scheduling of LLIDs for upstream data transmission is necessary to guarantee fair and efficient bandwidth allocation among all the LLIDs.) When both conditions are met, the DBA scheduler issues a grant to the requesting LLID. The grant allocates an upstream transmission time slot to the LLID.

Note that outstanding data for each LLID can be taken into account in the calculation of available space in the FIFO queues. Outstanding data is the "in-flight" data for which a grant for transmission has been given, but which has not been received by OLT 320. Records of outstanding data are stored in data structure 309. When calculating available space in a FIFO queue, DBA scheduler 303 subtracts the amount of outstanding data of the requesting LLID from the available physical space in the corresponding FIFO queue, and uses the result as the actual available space for future data transmission.

With regard to scheduling upstream transmission, one possible scheme is the hierarchical round-robin scheme, which can be used to fairly and efficiently allocate bandwidth among all LLIDs. Another possible scheduling scheme is strict priority scheduling. However, because SLAs usually place constraints on parameters such as average bit rate, maximum delay, etc., a transmission threshold (the maximum amount of data in each transmission) may be set for every LLID in the hierarchical round-robin scheme. A more detailed discussion of this scheme appears in the discussion related to FIG. 5 below.

OLT 320 further includes a bandwidth shaper 307, which retrieves data stored in the FIFO queues within FCT 305 and transmits the retrieved data to shared uplink 330. Bandwidth shaper 307 ensures that the data stored in FCT 305 is served in accordance with the priority classification and SLA pertinent to each LLID, which is stored in data structure 306. Like the scheduling mechanism within DBA scheduler 303, the scheduling mechanism within bandwidth shaper 307 is desired to be fair and efficient, and therefore can also use the hierarchical round-robin scheduling scheme.

Figure 4:
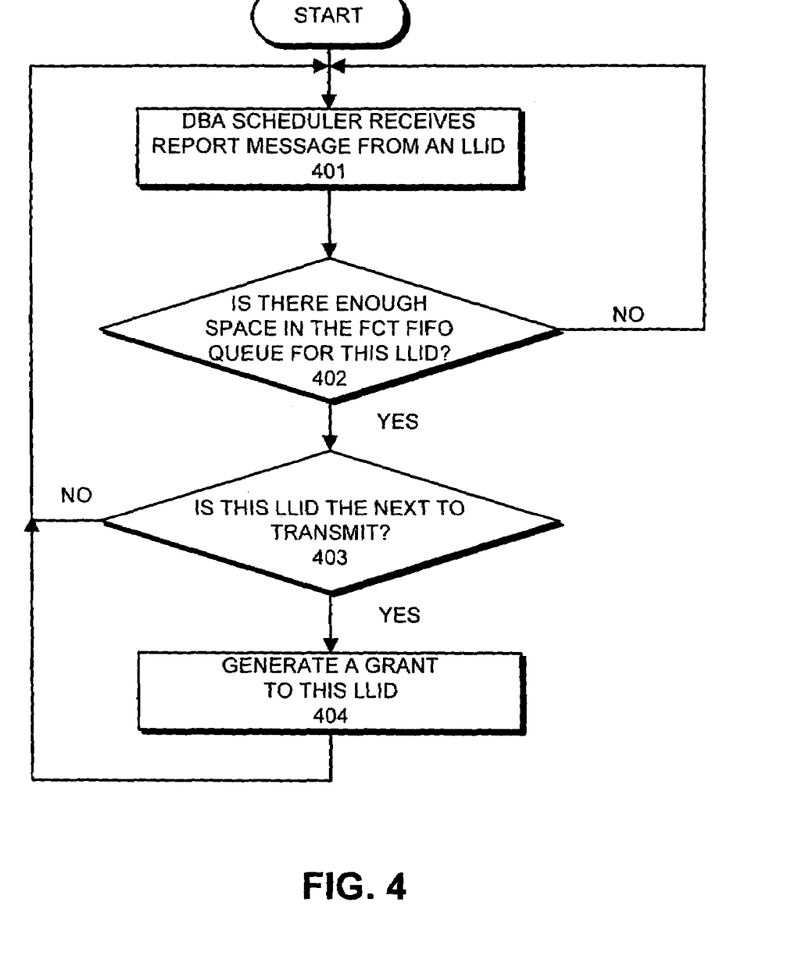
FIG. 4 presents a flow chart illustrating the dynamic upstream bandwidth allocation process in accordance with an embodiment of the present invention.

FIG. 4 presents a flow chart illustrating the dynamic upstream bandwidth allocation process in accordance with an embodiment of the present invention. The system starts by receiving a report message from an LLID at the DBA scheduler 303 (step 401). DBA scheduler 303 then determines if there is sufficient space in the FIFO queue within FCT 305 for this LLID (taking into account the outstanding data) (step 402). If there is not sufficient space, DBA scheduler temporarily holds the grant for the requesting LLID until sufficient space becomes available in the FIFO queue. Meanwhile, the system can receive and process requests from other LLIDs by returning to step 401.

If there is sufficient space in the FIFO queue within FCT 305, DBA scheduler 303 further determines if the requesting LLID is scheduled to transmit data next (step 403). If not, DBA scheduler 303 will temporarily hold the grant until the requesting LLID is the next to transmit. Meanwhile, the system can receive and process requests from other LLIDs by returning to step 401.

If it is the requesting LLID's turn to transmit, DBA scheduler generates a grant and sends it to the requesting LLID (step 404). The system then returns to step 401 and continues to receive and process subsequent requests.

Flow-control Mechanism

Figure 5:
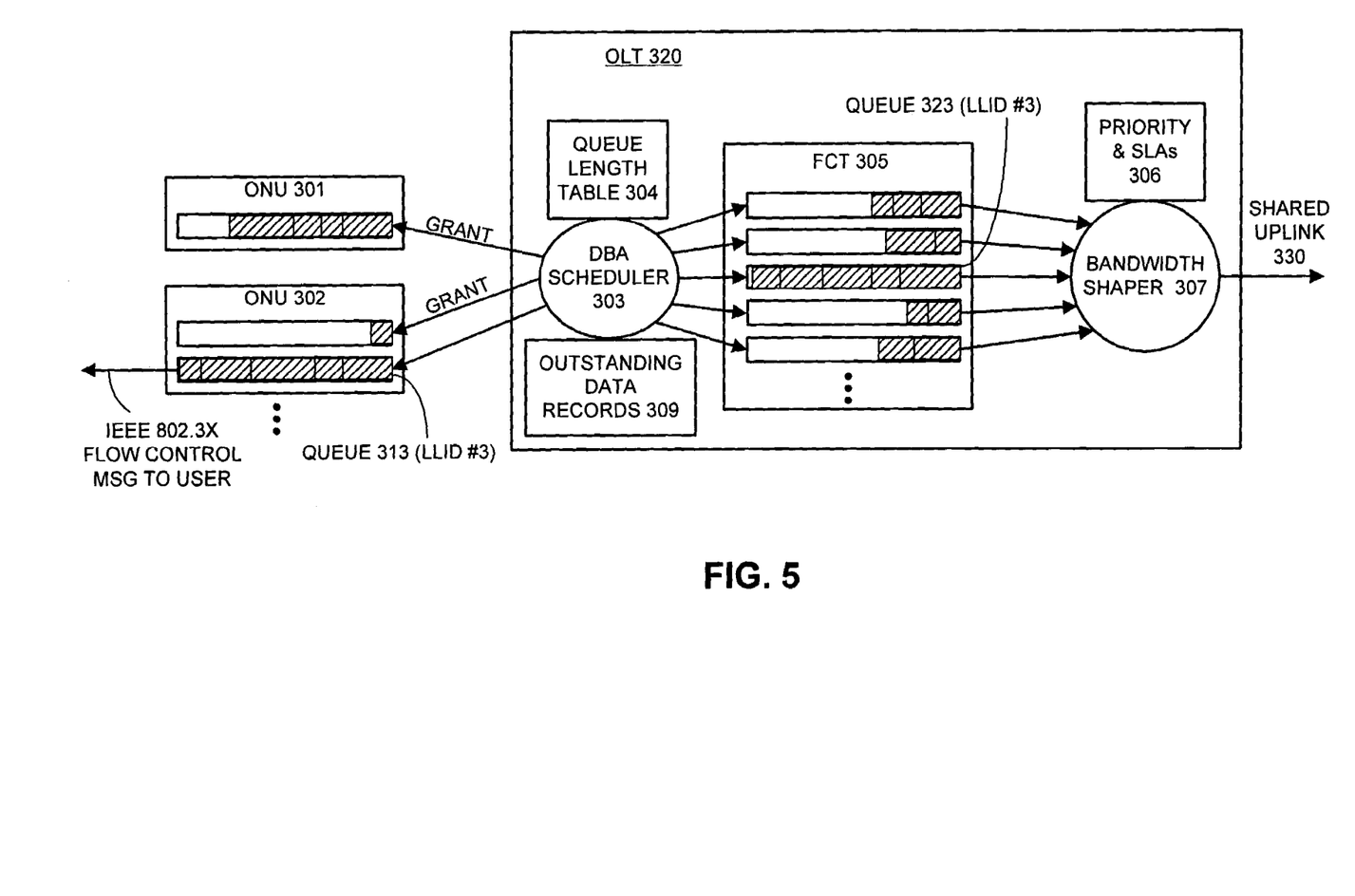
FIG. 5 illustrates a flow-control mechanism within an OLT that facilitates dynamic upstream bandwidth allocation in accordance with an embodiment of the present invention.

FIG. 5 illustrates a flow-control mechanism within an OLT that facilitates dynamic upstream bandwidth allocation in accordance with an embodiment of the present invention. In this example, when FIFO queue 323 is filled, DBA scheduler 303 stops granting transmission from LLID #3, thereby causing queue 313 to fill. ONU 302 can then generate a flow-control message in accordance with the IEEE 802.3×standard to the corresponding device or user to slow down, or pause, further upstream data transmission.

Hierarchical Round-robin Scheduling with Transmission Thresholds

Figure 6:
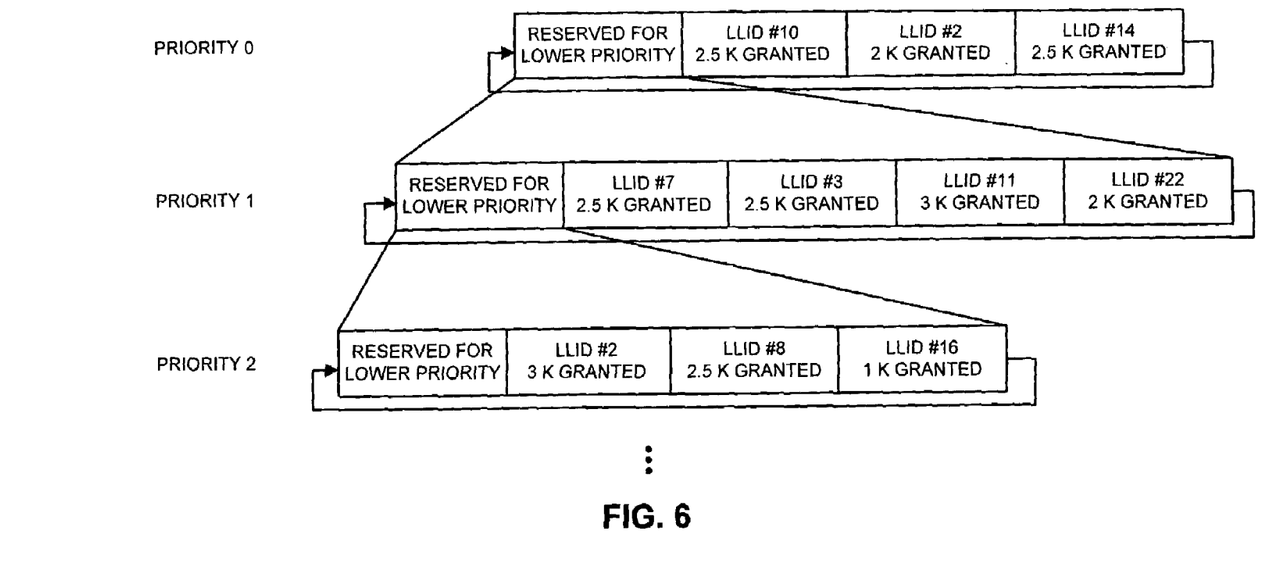
FIG. 6 illustrates a hierarchical round-robin scheduling scheme with transmission thresholds in accordance with an embodiment of the present invention.

FIG. 6 illustrates a hierarchical round-robin scheduling scheme with transmission thresholds in accordance with an embodiment of the present invention. This hierarchical round-robin scheduling is performed as follows:

First, group all LLIDs with the highest priority (priority 0). Within priority 0, assign each LLID a transmission slot in accordance to an amount of data burst the LLID is allowed to transmit upstream. The LLID is provisioned to not report a value greater than this amount. Although the aggregate of all report messages in a report frame may exceed this threshold, the amount of data implied in each individual message cannot exceed this burst size. The slot size provisioned for each LLID is determined such that all the LLIDs may be serviced within a fixed delay bounds. For example, if the delay bounds for priority 0 is one ms, and shared uplink 330's data speed is 1 Gb/s, then the total duration of priority 0 may not exceed 1000 Kb. Therefore, the aggregate slot size of priority 0 LLIDs would sum up to less than or equal to 1000 Kb.

Within priority 0, one slot is allocated for lower priority traffic. This slot is denoted as the drop-down slot. All lower-priority traffic is allowed to transmit within this reserved slot.

Next, group all of the LLIDs with the second highest priority (priority 1). Within priority 1, assign each LLID a transmission slot according to the maximum burst the LLID may transmit upstream. The LLID will be configured such that it will observe this maximum burst size when reporting. A slot in priority 1 is allowed to transmit inside the slot reserved for lower-priority traffic (the drop-down slot) within priority 0. Since a priority 1 LLID may only transmit when priority 0 is transmitting its drop-down slot, the delay of the queuing delay of priority 1 LLIDs is typically many times of the queuing delay of priority 0 LLIDs.

Within priority 1, there is similarly one slot reserved for lower-priority traffic.

As shown in FIG. 6, one can repeat steps similar to the above, and construct an entire hierarchy to accommodate all the LLIDs. Note that the transmission thresholds of LLIDs within a given priority level is based on the bandwidth and maximum allowable delay negotiated in the corresponding SLA.

Fault Tolerance

Figure 7:
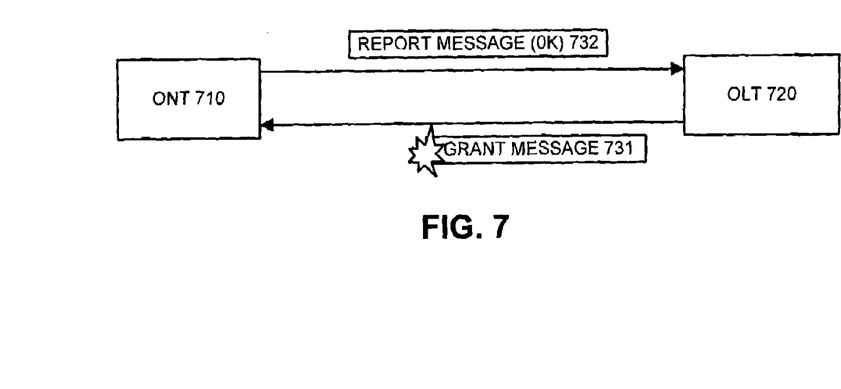
FIG. 7 illustrates a time-out mechanism for outstanding data that provides fault tolerance in accordance with an embodiment of the present invention.

FIG. 7 illustrates a time-out mechanism for outstanding data that provides fault tolerance in accordance with an embodiment of the present invention. During operation, it is possible that a grant message 731 is lost on its way from OLT 720 to ONU 610, for example due to a bit error. As a result, the subsequent grant messages received by ONU 710 for the same LLID will grant transmission sizes that are inconsistent with the amount of data available for upstream transmission. This may manifest itself by the ONU receiving a grant that is not a frame boundary. Once ONU 710 detects this inconsistency, it will start sending special report messages to OLT 720, requesting a transmission size of 0 Kb. Meanwhile, OLT 720 keeps track of when a piece of upstream data associated with a grant is due to arrive. Whether or not this piece of data physically arrives for the grant, the OLT removes the information corresponding to the outstanding data for the grant.

After sending the special report messages (with request of 0 K) for a period of time, ONU 710 resumes sending normal request messages. By this time the lost grant message, and its residual effects, would have timed out in OLT 720 and normal operation resumes.

It is possible for an ONU to track the amount of time between grants. If the amount of time between grants exceeds a certain interval, ONU 710 sets an alarm and sends a message to OLT 720 via an OAM frame. This can be done via an LLID on the ONU that is reserved for processor traffic. This message will instruct OLT 720 that an LLID is not being granted. One way for OLT 720 to deal with this situation is to reset the LLID entry in the DBA and bandwidth shaper tables.

In another scenario, OLT 720 periodically sends out polls to ONUs to see if an LLID has any data to send. Polls are grants for 64 bytes of data that have a forced-report flag asserted. The only upstream data transmitted as a response to a poll is a single report frame. The polling frequency reflects the SLA of an LLID. For example, the polls for priority 0 LLIDs are sent every 1 ms. If a grant previously occurred, the subsequent poll will be sent at 1 ms after that grant being sent.

Correspondingly, a non-poll grant is a grant that allows transmission of more than just a single report frame. An ONU tracks the amount of time elapsed between non-poll grants for each LLID. If this time exceeds a certain interval, the ONU sets an alarm. If the alarm is set, and the ONU has data to send, the ONU will send a message to the OLT, via an OAM frame, denoting the error condition. This will instruct the OLT that an LLID is in an error state. One way for the OLT to deal with this situation is to reset or modify the LLID entry in the DBA and bandwidth scheduler tables.

Hardware-based and Software-based DBA Scheduler

Figure 8A:
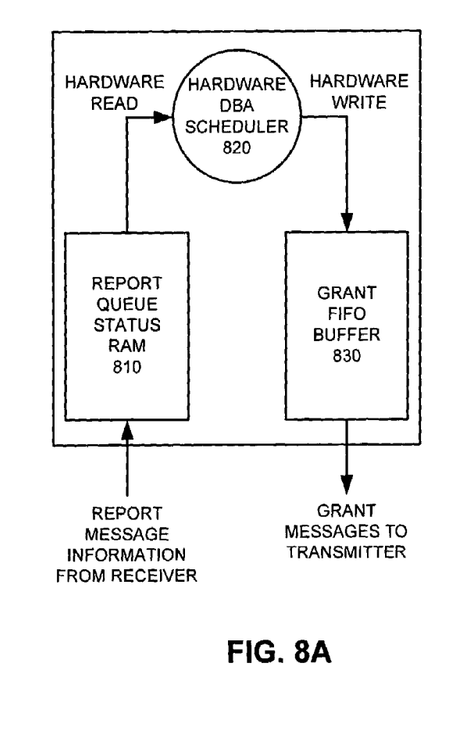
FIG. 8A illustrates a hardware-based DBA scheduler in accordance with an embodiment of the present invention.

FIG. 8A illustrates a hardware-based DBA scheduler in accordance with an embodiment of the present invention. One way to implement a DBA scheduler is to embed it in the OLT hardware, such as in an ASIC or FPGA. In general, a hardware-based DBA scheduler is fast and has a small footprint, but it may also lack the flexibility necessary for implementing user-defined arbitrary scheduling policies.

As shown in FIG. 8A, in a hardware-based implementation, the receiver of an OLT stores queue information of different ONUs in a report-queue status RAM 810 within the OLT. Hardware DBA scheduler 820 reads the queue status information from report-queue status RAM 810, and schedules grant messages corresponding to each report message based on given scheduling policies (e.g., SLAs). Scheduler 820 then writes the grant messages to a buffer, such as grant FIFO buffer 830. Subsequently, the grant messages are removed from the grant buffer and transmitted to ONUs by the transmitter.

Figure 8B:
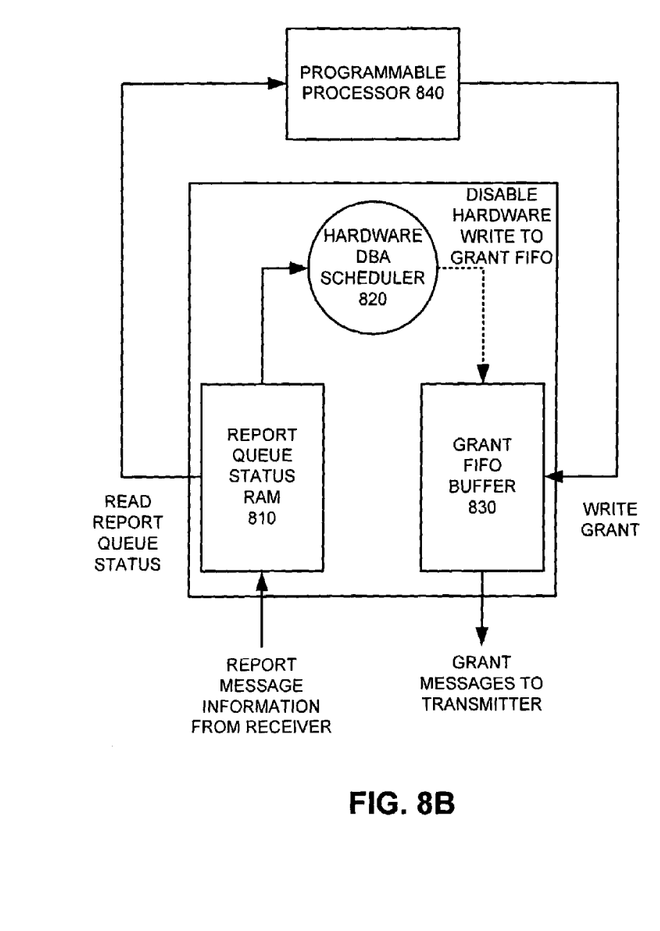
FIG. 8B illustrates a software-based DBA scheduler in accordance with an embodiment of the present invention.

FIG. 8B illustrates a software-based DBA scheduler in accordance with an embodiment of the present invention. Although hardware-based DBA scheduler can be fast and have small footprint, sometimes it is desirable to have the flexibility in a DBA scheduler to implement user-defined arbitrary scheduling policies. One way to obtain such flexibility is to use an external programmable processor, which functions as a software-based DBA scheduler.

As shown in FIG. 8B, in a software-based implementation, the receiver of an OLT stores queue information of different ONUs in a report-queue status RAM 810 within the OLT. The queue status information is then read by an external programmable processor 840. Note that a user may program processor 840 to implement arbitrary scheduling policies. Also, processor 840 can reside on the same board as report-queue status RAM 810, or can reside independently outside the OLT. Based on given scheduling policies and the report-queue status information, processor 840 schedules grant messages corresponding to each report message. Processor 840 then writes the grant messages to a buffer, such as grant FIFO buffer 830. Subsequently, the grant messages are removed from the grant buffer and transmitted to ONUs by the transmitter.

It is possible to have both hardware-based and software-based DBA schedulers, as in the example illustrated in FIG. 8B. In this example, a user has the freedom to choose between the hardware-based DBA scheduler and the software-based programmable DBA scheduler. Typically, when a software-based DBA scheduler (processor 840) is writing a grant message to grant FIFO buffer 830, hardware DBA scheduler 820 is prohibited to write grant messages to grant FIFO buffer 830 to prevent conflicts.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for dynamically allocating upstream bandwidth in a passive optical network that includes a central node and at least one remote node, wherein each remote node is coupled to at least one logical entity corresponding to a device or a user; wherein each remote node includes a number of queues, each of which is associated with a logical entity and stores upstream data from the logical entity; and wherein a shared out-going uplink couples the central node to an external network outside of the passive optical network;

the method comprising:

receiving a request from a remote node for a grant to transmit upstream data from a logical entity associated with the remote node to the central node, wherein the request reports the state of a queue associated with a logical entity; wherein the size of the data to be transmitted does not exceed a transmission threshold assigned to that logical entity; and wherein a logical entity may not request more than what is allowed by the corresponding transmission threshold;

if the request satisfies a bandwidth allocation policy, issuing a grant to the remote node to transmit upstream data based on a hierarchical round-robin scheduling, wherein logical entities of a lower priority take turns in transmitting in a slot reserved for lower-priority traffic among the transmission slots for higher-priority traffic, and wherein the slot sizes of a respective priority are limited by the delay bound for that priority;

in response to the grant, receiving upstream data from the remote node;

storing the received upstream data in a number of FIFO queues, wherein a respective FIFO queue corresponds to a logical entity; and retrieving and transmitting the received upstream data stored in the FIFO queue based on each logical entity's priority classification and/or service level agreement, thereby ensuring that the bandwidth allocated to each logical entity is in compliance with the corresponding service level agreement.

2. The method of claim 1, further comprising:

storing the state of the queue associated with the logical entity;

reading the state of the queue associated with the logical entity into a hardware scheduler;

scheduling a grant in response to the request at the hardware scheduler;

writing the grant to a grant buffer from the hardware scheduler; and transmitting the grant to the remote node.

3. The method of claim 1, the method further comprising:

storing the state of the queue associated with the logical entity;

reading the state of the queue associated with the logical entity into a programmable processor;

scheduling a grant at the programmable processor in response to the request;

writing the grant to a grant buffer from the programmable processor; and transmitting the grant to the remote node.

4. The method of claim 3, wherein the programmable processor is programmed to implement one or more scheduling policies.

5. The method of claim 3, wherein the programmable processor is an on-board processor which resides with a hardware scheduler on a circuit board.

6. The method of claim 3, wherein the programmable processor is an external processor which resides outside a circuit board where a hardware scheduler resides.

7. A system that dynamically allocates upstream bandwidth in a passive optical network, comprising:
   a central node;
   at least one remote node, wherein each remote node is coupled to at least one logical entity corresponding to a device or a user; and wherein each remote node includes a number of queues, each of which is associated with a logical entity and stores upstream data from the logical entity;
   a shared out-going uplink that couples the central node to an external network outside of the passive optical network;
   a dynamic bandwidth allocation mechanism within the central node configured to,
      receive a request from a remote node for a grant to transmit upstream data from a logical entity associated to the remote node to the central node, wherein the request reports the state of a queue associated with a logical entity; wherein the size of the data to be transmitted does not exceed a transmission threshold assigned to that logical entity; and
   wherein a logical entity may not request more than what is allowed by the corresponding transmission threshold, and
      if the request satisfies a bandwidth allocation policy, issue a grant to the remote node to transmit upstream data based on a hierarchical round-robin scheduling, wherein logical entities of a lower priority take turns in transmitting in a slot reserved for lower-priority traffic among the transmission slots for higher-priority traffic, and wherein the slot sizes of a respective priority are limited by the delay bound for that priority;
   a receiving mechanism configured to receive upstream data from the remote node in response to the grant; and
   a bandwidth shaping mechanism configured to:
      store the received upstream data in a number of FIFO queues, wherein a respective FIFO queue corresponds to a logical entity; and
      retrieve and transmit the received upstream data stored in the FIFO queue based on each logical entity's priority classification and/or service level agreement, thereby ensuring the bandwidth allocated to each logical entity is in compliance with the corresponding service level agreement.

8. The system of claim 7, wherein the dynamic bandwidth allocation mechanism is further configured to store the state of the queue associated with the logical entity; and wherein the apparatus further comprises a hardware scheduler configured to,
   read the state of the queue associated with the logical entity into a hardware scheduler;
   schedule a grant in response to the request at the hardware scheduler;
   write the grant to a grant buffer from the hardware scheduler; and
   transmit the grant to the remote node.

9. The system of claim 7, wherein the dynamic bandwidth allocation mechanism is further configured to store the state of the queue associated with the logical entity; and wherein the apparatus further comprises a programmable processor configured to,
   read the state of the queue associated with the logical entity into a programmable processor;
   schedule a grant in response to the request at the programmable processor;
   write the grant to a grant buffer from the programmable processor; and
   transmit the grant to the remote node.

10. The system of claim 9, wherein the programmable processor is programmed to implement one or more scheduling policies.

11. The system of claim 9, wherein the programmable processor is an on-board processor which resides with a hardware scheduler on a circuit board.

12. The system of claim 9, wherein the programmable processor is an external processor which resides outside a circuit board where a hardware scheduler resides.

13. A computer-readable medium encoded with instructions that when executed by a computer cause the computer to perform a method for dynamically allocating upstream bandwidth in a passive optical network that includes a central node and at least one remote node, wherein each remote node is coupled to at least one logical entity corresponding to a device or a user; wherein each remote node includes a number of queues, each of which is associated with a logical entity and stores upstream data from the logical entity; and wherein a shared out-going uplink couples the central node to an external network outside of the passive optical network;
   the method comprising:
   receiving a request from a remote node for a grant to transmit upstream data from a logical entity associated with the remote node to the central node, wherein the request reports the state of a queue associated with a logical entity; wherein the size of the data to be transmitted does not exceed a transmission threshold assigned to that logical entity; and wherein a logical entity may not request more than what is allowed by the corresponding transmission threshold;
   if the request satisfies a bandwidth allocation policy, issuing a grant to the remote node to transmit upstream data based on a hierarchical round-robin scheduling, wherein logical entities of a lower priority take turns in transmitting in a slot reserved for lower-priority traffic among the transmission slots for higher-priority traffic, and wherein the slot sizes of a respective priority are limited by the delay bound for that priority;
   in response to the grant, receiving upstream data from the remote node;
   storing the received upstream data in a number of FIFO queues, wherein a respective FIFO queue corresponds to a logical entity; and
   retrieving and transmitting the received upstream data stored in the FIFO queue based on each logical entity's priority classification and/or service level agreement, thereby ensuring the bandwidth allocated to each logical entity is in compliance with the corresponding service level agreement.

14. The computer-readable medium of claim 13, wherein the method further comprises:
   storing the state of the queue associated with the logical entity;
   reading the state of the queue associated with the logical entity into a hardware scheduler;
   scheduling a grant in response to the request at the hardware scheduler;
   writing the grant to a grant buffer from the hardware scheduler; and
   transmitting the grant to the remote node.

15. The computer-readable medium of claim 13, wherein the method further comprising:
   storing the state of the queue associated with the logical entity;
   reading the state of the queue associated with the logical entity into a programmable processor;
   scheduling a grant at the programmable processor in response to the request;
   writing the grant to a grant buffer from the programmable processor; and
   transmitting the grant to the remote node.

16. The computer-readable medium of claim 15, wherein the programmable processor is programmed to implement one or more scheduling policies.

17. The computer-readable medium of claim 15, wherein the programmable processor is an on-board processor which resides with a hardware scheduler on a circuit board.

18. The computer-readable medium of claim 15, wherein the programmable processor is an external processor which resides outside a circuit board where a hardware scheduler resides.

* * * * *